United States Patent
Imada

(10) Patent No.: US 7,924,409 B2
(45) Date of Patent: Apr. 12, 2011

(54) RANGEFINDER AND RANGE FINDING METHOD

(75) Inventor: Katsumi Imada, Nara (JP)

(73) Assignee: Panasonic Corporation, Osaka (JP)

( * ) Notice: Subject to any disclaimer, the term of this patent is extended or adjusted under 35 U.S.C. 154(b) by 43 days.

(21) Appl. No.: 12/595,528

(22) PCT Filed: Feb. 17, 2009

(86) PCT No.: PCT/JP2009/000641
§ 371 (c)(1),
(2), (4) Date: Oct. 12, 2009

(87) PCT Pub. No.: WO2009/104381
PCT Pub. Date: Aug. 27, 2009

(65) Prior Publication Data
US 2010/0118291 A1  May 13, 2010

(30) Foreign Application Priority Data
Feb. 18, 2008  (JP) .................. 2008-036001

(51) Int. Cl.
*G01C 3/00* (2006.01)
(52) U.S. Cl. ..................... 356/3.14; 356/3.13
(58) Field of Classification Search .............. 356/3.13, 356/3.14, 4.01
See application file for complete search history.

(56) References Cited

U.S. PATENT DOCUMENTS

| | | | |
|---|---|---|---|
| 6,046,795 A * | 4/2000 | Sugiyama et al. | 356/3.14 |
| 6,337,736 B1 | 1/2002 | Sugiyama et al. | |
| 2004/0145722 A1 * | 7/2004 | Uomori et al. | 356/4.01 |
| 2004/0263824 A1 | 12/2004 | Yamamoto et al. | |
| 2005/0280709 A1 | 12/2005 | Katayama | |
| 2009/0002505 A1 * | 1/2009 | Imada | 348/218.1 |

FOREIGN PATENT DOCUMENTS

| | | |
|---|---|---|
| JP | 04-043911 | 2/1992 |
| JP | 10-232128 | 9/1998 |
| JP | 2001-099643 | 4/2001 |
| JP | 2005-017078 | 1/2005 |
| JP | 2006-030157 | 2/2006 |
| JP | 2007-322128 | 12/2007 |

OTHER PUBLICATIONS

International Search Report for corresponding application no. PCT/JP2009/000641 mailed Apr. 7, 2009.

* cited by examiner

*Primary Examiner* — Isam Alsomiri
(74) *Attorney, Agent, or Firm* — Renner, Otto, Boisselle & Sklar, LLP

(57) ABSTRACT

A rangefinder includes: a lens system (3) including multiple lenses (3a, 3b) arranged so that their optical axes are parallel to each other and integrated together; an imager (4) having image capturing areas (4a, 4b) that face the lenses (3a, 3b) and transforming light incident on the image capturing areas into an electrical signal; a transparent plate (6) arranged between the imager and the lens system and having substantially the same thermal expansion coefficient as the lenses (3a, 3b); markers (11a, 11b) provided on the transparent plate for the lenses (3a, 3b) and each casting its shadow on an associated image capturing area (4a, 4b); a signal receiving section (21) receiving the electrical signal from the imager; and an image processing section (22) correcting the positions of the optical axes of the lenses by reference to information about the locations of the markers (11a, 11b) on the respective images, thereby determining the distance to an object by performing a triangulation based on the corrected positions of the optical axes.

10 Claims, 9 Drawing Sheets

(a)

(b)

(a) IF T=T1 (°C)

(b) IF T=T2 (=T1+ΔT)(°C)

(a) IF T=T1 (°C)

(b) IF T=T2 (=T1+ΔT)(°C)

RANGEFINDER AND RANGE FINDING METHOD

TECHNICAL FIELD

The present invention relates to a rangefinder for determining the distance to an object based on parallax between multiple imaging optical systems and a range finding method using such a rangefinder.

BACKGROUND ART

A binocular rangefinder is known as device for determining the distance to an object and has been used to determine the distance between running cars and as a member of an autofocusing system for cameras or a three-dimensional shape measuring system.

Such a binocular rangefinder includes binocular optical systems, on each of which a light beam reflected from an object is incident, and its associated imagers that produce images based on the light beams that have been incident on the optical systems. By using such a binocular rangefinder, the imagers can produce images based on the light beams that have been incident on the binocular optical systems, and the distance to the object can be determined based on the parallax between those two images.

In a conventional binocular rangefinder, two lenses are arranged side by side either horizontally or vertically so that each of those lenses produces an image on its associated imager (see Patent Document No. 1, for example).

FIG. 10 illustrates how a binocular rangefinder carries out triangulation. As shown in FIG. 10, the light reflected from the object 9 is incident on first and second lenses (or optical systems) 3a and 3b, thereby producing the object's images on first and second image capturing planes 4a and 4b, respectively.

Suppose a measuring point is set at a point P on the object 9 and is located on the optical axis of the first lens 3a. In that case, the image of the point P will be produced at the intersection between the optical axis of the first lens 3a and the first image capturing plane 4a. On the second image capturing plane 4b, on the other hand, the image of the point P will be produced at a point that deviates from the optical axis of the second lens 3b in the base line direction by Δ, which is called the "magnitude of parallax". In this case, the distance z from the first and second lenses 3a and 3b to the point P (as measured parallel to their optical axes), the base line length B that is the distance between the optical axes of the first and second lenses 3a and 3b, the focal length f of the first and second lenses 3a and 3b, and the magnitude of parallax Δ will satisfy the following approximation equation:

$$z \approx B \cdot f / \Delta \tag{1}$$

Since the base line length B and the focal length f are already known, the distance to the object 9 can be determined by extracting the magnitude of parallax Δ from the images. In this case, the magnitude of parallax Δ can be extracted by performing pattern matching between the image produced on the image capturing plane 4a through the first lens 3a and the one produced on the image capturing plane 4b through the second lens 3b.

As the temperature of the environment surrounding the rangefinder varies, however, the respective members that form the rangefinder will expand or shrink to a certain degree. The more complex the structure of the rangefinder, the more significant the error to be caused by complicated shifts of the optical axes due to the temperature variation. In order to overcome such a problem, according to a proposed method, the temperature is measured with a temperature sensor arranged between the lenses, and the interval between the optical axes is calculated and corrected based on a variation in the temperature and the linear expansivity of the material of the respective members (see Patent Document No. 2, for example).

Patent Document No. 1: Japanese Patent Application Laid-Open Publication No. 4-43911

Patent Document No. 2: Japanese Patent Application Laid-Open Publication No. 10-232128

DISCLOSURE OF INVENTION

Problems to be Solved by the Invention

However, according to the method of making a correction based on a value to be determined unequivocally by the linear expansivity and the temperature detected by the temperature sensor as in Patent Document No. 2, error will occur inevitably due to a variation in the characteristic of the temperature sensor, the delay in the variation in base line length with respect to the detection of the temperature, and the variation in the linear expansivity of the material of the respective members.

Also, the rangefinders disclosed in Patent Documents Nos. 1 and 2 have a structure in which multiple separate lenses are arranged independently of each other. Meanwhile, recently, a rangefinder including an array of lenses (or a lens system), in which a number of lenses are integrated together, has been developed. Such a rangefinder has a smaller number of members, and can be installed more easily, than a rangefinder in which multiple lenses are arranged separately from each other. On top of that, a rangefinder of the former type can have a smaller overall size than the latter type, too.

Nevertheless, in a rangefinder with such an array of lenses that are integrated together, the overall array will expand or shrink according to the temperature, thus shifting the optical axis more significantly as a result of the temperature variation. The smaller the size of the rangefinder, the more significantly the measured value gets affected by a shift of the optical axis.

It is therefore an object of the present invention to provide a rangefinder and range finding method that can determine the distance to an object highly accurately even if the environmental temperature varies.

Means for Solving the Problems

A rangefinder according to the present invention includes: a lens system including a number of lenses, which are arranged so that their optical axes are parallel to each other and which are integrated together; an imager, which has a number of image capturing areas that face the respective lenses and which transforms light that has been incident on the image capturing areas into an electrical signal; a light-transmitting flat plate, which is arranged between the imager and the lens system and which has substantially the same thermal expansion coefficient as the lenses; a number of markers, which are provided on the light-transmitting flat plate for the respective lenses and each of which casts its shadow on an associated one of the image capturing areas; a signal receiving section, which receives the electrical signal from the imager, thereby generating a plurality of image signals representing images that have been produced in the respective image capturing areas; and an image processing section, which receives the image signals, corrects the positions of the optical axes of the lenses by reference to information about the locations of the markers' shadows on the respective images, and determines the distance to an object by performing a triangulation based on the corrected positions of the optical axes.

In one preferred embodiment, the image processing section includes a marker detection processing section, a comparison computation processing section, and a correction processing section. The marker detection processing section determines the locations of the markers' shadows on the respective images to be detected marker locations. The comparison computation processing section calculates the magnitude of parallax detected based on a difference in the object's location between the respective images. The correction processing section corrects the positions of the optical axes based on initial marker locations and initial optical axis positions that have been detected in advance and the detected marker locations. And the image processing section determines the distance to the object by performing the triangulation based on the corrected optical axis positions and the magnitude of the parallax detected.

In this particular preferred embodiment, the initial marker locations and the initial optical axis positions are detected when the lenses and the light-transmitting flat plate have a first temperature, while the detected marker locations are determined when the lenses and the light-transmitting flat plate have a second temperature.

In another preferred embodiment, each said marker casts its shadow substantially on the center of its associated image capturing area.

In still another preferred embodiment, the markers are a first set of peripheral markers that cast their shadows on the periphery of their associated image capturing areas. A second set of peripheral markers are further provided on the light-transmitting flat plate for the respective lenses. Each of the peripheral markers of the second set casts its shadow on the periphery of an associated one of the image capturing areas. Each initial optical axis position is defined so as to be substantially on the line that connects together the respective initial marker locations of their associated peripheral markers in the first and second sets.

In yet another preferred embodiment, the lens system and the light-transmitting flat plate are fixed with the same member by the same fixing method.

In yet another preferred embodiment, the markers are placed on one side of the light-transmitting flat plate so as to face the image capturing areas.

A range finding method according to the present invention is a method for determining the distance to an object using a rangefinder that includes: a lens system including a number of lenses, which are arranged so that their optical axes are parallel to each other and which are integrated together; an imager, which has a number of image capturing areas that face the respective lenses and which transforms light that has been incident on the image capturing areas into an electrical signal; a light-transmitting flat plate, which is arranged between the imager and the optical system and which has substantially the same thermal expansion coefficient as the lenses; and a number of markers, which are provided on the light-transmitting flat plate for the respective lenses and each of which casts its shadow on an associated one of the image capturing areas. The method includes the steps of: (a) receiving the electrical signal from the imager, thereby generating a plurality of image signals representing images that have been produced in the respective image capturing areas; (b) determining the locations of the markers' shadows on the respective images to be detected marker locations; (c) calculating the magnitude of parallax detected based on a difference in the object's location between the respective images; and (d) correcting the positions of the optical axes of the lenses based on initial marker locations and initial optical axis positions that have been detected in advance and the detected marker locations and determining the distance to the object by performing a triangulation based on the corrected optical axis positions and the magnitude of the parallax detected.

In one preferred embodiment, each said marker casts its shadow substantially on the center of its associated image capturing area.

In another preferred embodiment, the markers are a first set of peripheral markers that cast their shadows on the periphery of their associated image capturing areas. A second set of peripheral markers are further provided on the light-transmitting flat plate for the respective lenses. Each of the peripheral markers of the second set casts its shadow on the periphery of an associated one of the image capturing areas. Each initial optical axis position is defined so as to be substantially on the line that connects together the respective initial marker locations of their associated peripheral markers in the first and second sets. The step (b) includes determining the locations of the shadows of the peripheral markers in the first and second sets that are cast on the respective image capturing areas.

EFFECTS OF THE INVENTION

According to the present invention, even if the temperature of the environment surrounding a rangefinder has varied, the shifts of the optical axis positions of the multiple lenses can also be tracked and the magnitude of parallax can also be corrected by reference to information about the locations of markers. As a result, the error to be caused due to a variation in environmental temperature can be reduced so much that the distance to the object can be determined highly accurately.

Figure 1:
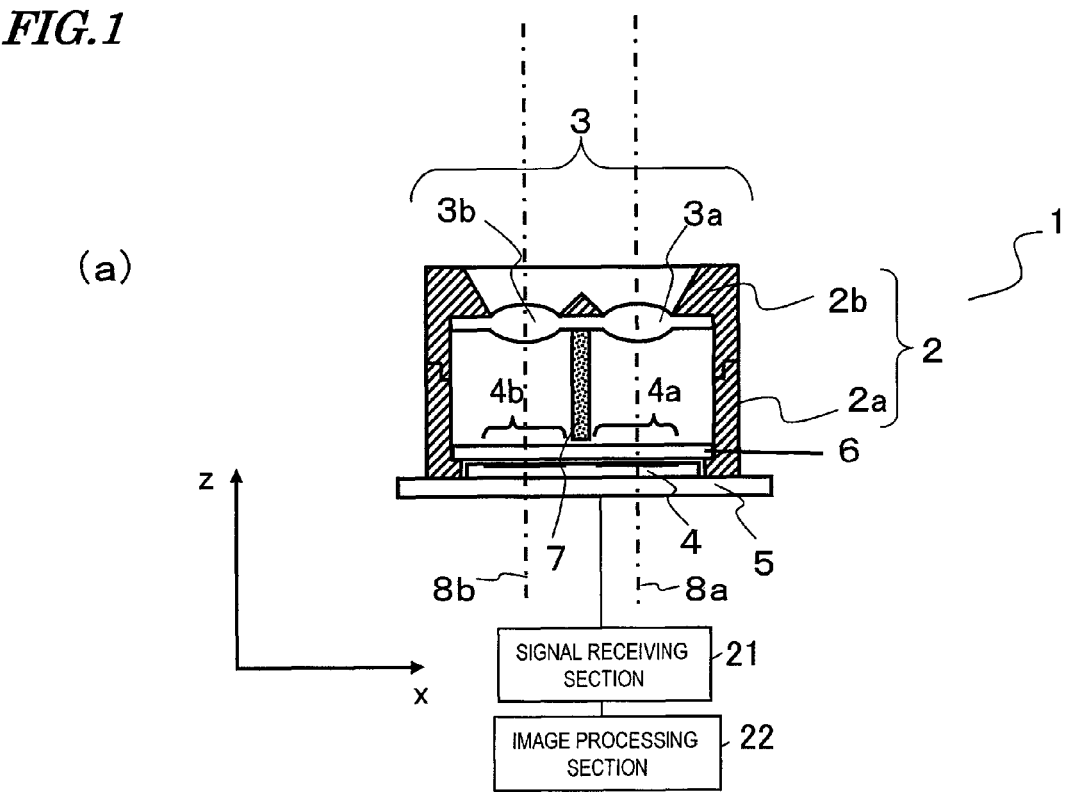
FIG. 1(a) is a cross-sectional view illustrating a first specific preferred embodiment of a rangefinder according to the present invention and FIG. 1(b) is a perspective view illustrating the relative positions of the transparent plate 6 and the imager 4 according to the first preferred embodiment.
Figure 1:
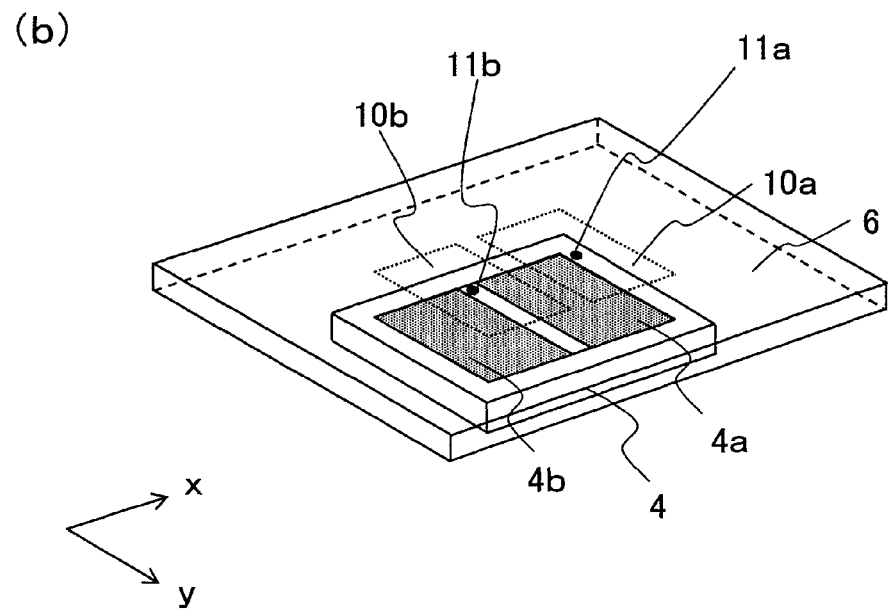

DESCRIPTION OF REFERENCE NUMERALS 1 rangefinder
2a lower half of body tube
2b upper half of body tube
3a first optical system
3b second optical system
4 imager
4a first image capturing area
4b second image capturing area
5 circuit board
6 cover member
7 shielding plate
8a optical axis of the first optical system
8b optical axis of the second optical system
9 object
10a region that light ray to produce image on the first image capturing area passes through
10b region that light ray to produce image on the second image capturing area passes through
11a first marker
11b second marker
13a, 13b, 13c, 13d marker image
21 signal receiving section
22 image processing section
23 calibration processing section
24 comparison computation processing section
25 marker detection processing section
26 correction value calculating section
27 correction processing section
28 result output section
14a, 14b optical axis position on image capturing plane
50a image detected from the first image capturing area
50b image detected from the second image capturing area
51 first detection block
52 second detection block

BEST MODE FOR CARRYING OUT THE INVENTION

EMBODIMENT 1

FIG. 1(a) is a cross-sectional view illustrating a first specific preferred embodiment of a rangefinder according to the present invention. As Shown in FIG. 1(a), the rangefinder 1 of this preferred embodiment includes a lens system 3 including first and second lenses 3a and 3b, an imager 4 with first and second image capturing areas 4a and 4b, and a transparent plate 6, which is arranged between the imager 4 and the lens system 3 so as to be located near the imager 4.

The transparent plate 6 is made of a material that has substantially the same thermal expansion coefficient as the lens system 3. That is to say, the lens system 3 and the transparent plate 6 may be made of either quite the same material or two different materials with substantially the same thermal expansion coefficients. As used herein, to "have substantially the same thermal expansion coefficients" means that the transparent plate 6 has a thermal expansion coefficient that is 95% through 105% of that of the lens system 3.

According to this preferred embodiment, the difference in the magnitude of a change of a certain property (such as the volume in most cases) between the transparent plate 6 and the lens system 3 due to a temperature variation needs to satisfy a predetermined tolerance, which is defined to be ±5% in this preferred embodiment. That is why the "substantially the same" thermal expansion coefficients should also satisfy that tolerance.

The first and second lenses 3a and 3b are arranged so that their optical axes 8a and 8b are parallel to each other, both made of an optical resin or an optical glass material that can be formed using a press machine, and are integrated together. As used herein, the "lens system that has been integrated together" may be either a lens system that has been formed using a single die so as to have no junction or a lens system in which a number of independent members that have been formed separately are connected together. For example, the first and second lenses 3a and 3b may be formed by stacking a number of thin lenses one upon the other in the thickness direction, for example.

In the imager 4, the first image capturing area 4a thereof faces the first lens 3a and the second image capturing element 4b thereof faces the second lens 3b. The imager 4 photoelectrically transforms the light that has been incident on the first and second image capturing areas 4a and 4b into an electrical signal. Also, the imager 4 is die-bonded onto a circuit board 5 and electrically connected to circuits (not shown) on the circuit board 5 by wire bonding, for example.

On the other hand, the lens system 3 and the transparent plate 6 are fixed on a cylindrical body tube 2 made of resin, for example. The body tube 2 consists of a body tube lower half 2a that is secured onto the circuit board 5 and a body tube upper half 2b that is combined with the body tube lower half 2a at the upper end thereof. The body tube lower and upper halves 2a and 2b may be made of either quite the same material or two different materials with similar thermal properties (such as the thermal expansion coefficient) and are bonded together with an adhesive. The lower end of the body tube lower half 2a protrudes inward inside of the tube, and the transparent plate 6 is put on that protrusion. Meanwhile, the body tube upper half 2b has a hood portion, which fixes the lens system 3 by holding not only the respective lenses around their effective diameters with its ring portions but also the periphery of the array of the lenses that are integrated together.

There is a shield wall 7 inside the body tube 2. Specifically, the shield wall 7 is located under an intermediate portion between the first and second lenses 3a and 3b, i.e., over the boundary between the first and second image capturing areas 4a and 4b. The shield wall 7 prevents the light that has passed through the first lens 3a from entering the second image capturing area 4b and also prevents the light that has passed through the second lens 3b from entering the first image capturing area 4a.

FIG. 1(b) is a perspective view illustrating the relative positions of the transparent plate 6 and the imager 4 according to the first preferred embodiment. As shown in FIG. 1(b), first and second markers 11a and 11b are placed on the transparent plate 6.

The first marker 11a is put at a point associated with the first lens 3a, i.e., in a region 10a of the transparent plate 6, through which a light ray that is going to produce an image on the first image capturing area 4a passes. On the other hand, the second marker 11b is put at a point associated with the second lens 3b, i.e., in a region 10b of the transparent plate 6, through which a light ray that is going to produce an image on the second image capturing area 4b passes. The first and second markers 11a and 11b are several times as large as a pixel and have the property of transmitting no light. And the first and second markers 11a and 11b may be made by printing, for example.

In this first preferred embodiment, the first marker 11a is located roughly at the center of the region 10a of the transparent plate 6. Likewise, the second marker 11b is located almost at the center of the region 10b of the transparent plate 6. Thus, the first and second markers 11a and 11b will cast their shadows on the first and second image capturing areas 4a and 4b, respectively, thereby leaving dark spots on the images being produced on the image capturing areas 4a and 4b. The shadows of the markers 11a and 11b that are cast on the image capturing areas 4a and 4b are darker than the rest of the images and are typically black.

If the markers 11a and 11b were too distant from the imager 4, then it would be impossible to locate the shadows of the markers 11a and 11b on the images produced on the imager 4. That is why care should be taken in determining where to arrange the transparent plate 6. In this preferred embodiment, the transparent plate 6 is arranged so that the markers 11a and 11b are 0.3 mm away from the image capturing plane.

FIG. 1(b) illustrates almost circular markers 11a and 11b. However, the markers 11a and 11b do not have to be circular. For example, in a situation where the markers have a cross shape or any other geometric shape, even if some dust has been deposited on the transparent plate 6, the dust will not be taken for the markers 11a and 11b by mistake. To prevent any dust from entering the rangefinder being assembled, the assembly process is preferably carried out in an almost dust-free environment such as a clean room or a clean booth.

Figure 2:
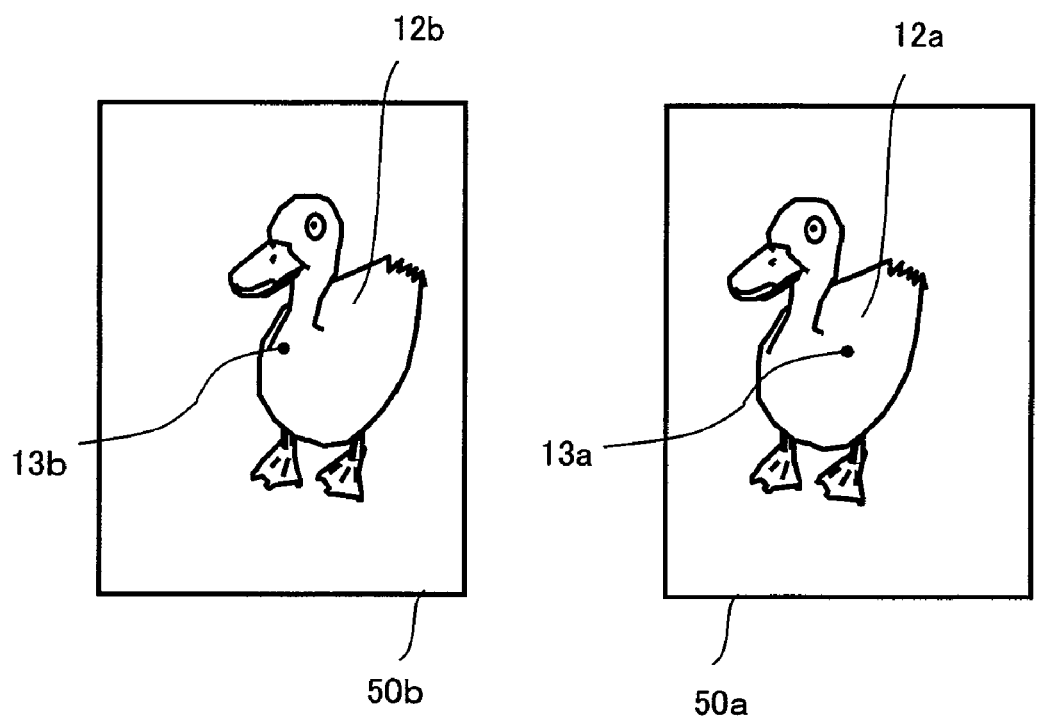
FIG. 2 illustrates an example of the images 50a and 50b produced on the first and second image capturing areas 4a and 4b, respectively.

FIG. 2 illustrates an example of the images 50a and 50b produced on the first and second image capturing areas 4a and 4b, respectively. The position of the object 12a on the image 50a has shifted from that of the object 12b on the image 50b by the parallax. On the other hand, since the markers 11a and 11b (see FIG. 1(b)) are just casting shadows on the images 50a and 50b, there should be no shift between the shadows 13a and 13b of the markers on the images 50a and 50b due to the parallax. That is why the relative locations of the markers on the transparent plate 6 are transferred as they are onto the images 50a and 50b.

The first and second lenses 3a and 3b will expand or shrink by nature as the temperature varies. That is why according to the temperature when the distance is determined, the positions of the optical axes will change, so will the locations of the optical axes on the first and second image capturing areas 4a and 4b (i.e., the origins of the images 50a and 50b). And such a shift of the optical axes will affect the magnitude of the parallax calculated on the images 50a and 50b and the value of the base line length. In this preferred embodiment, the transparent plate 6 has substantially the same thermal expansion coefficient as the first and second lenses 3a and 3b. Therefore, if the temperature varies, the transparent plate 6 will expand or shrink as much as the first and second lenses 3a and 3b. As the markers 11a and 11b placed on the transparent plate 6 behave just like the optical axes of the first and second lenses 3a and 3b, the magnitude of the parallax and the base line length can be corrected by reference to information about the locations of the markers 11a and 11b. Such correction may be made by detecting in advance, and using, the initial locations of the markers' shadows and positions of the optical axes on the imager 4 as initial values right after the rangefinder has been assembled.

Hereinafter, it will be described specifically how to process the images 50a and 50b that has been produced by the imager 4.

The images 50a and 50b are transformed into an electrical signal by photodiodes (not shown) that are arranged two-dimensionally near the surface of the imager 4. To the imager 4, connected are a signal receiving section 21 and an image processing section 22. The signal receiving section 21 receives the electrical signal from the imager 4 and generates image signals representing those images 50a and 50b. After that, the image processing section 22 receives and processes the image signals by reference to information about the locations of the markers 11a and 11b on the images 50a and 50b, thereby calculating the distance to the object without being affected by any variation in environmental temperature.

Figure 3:
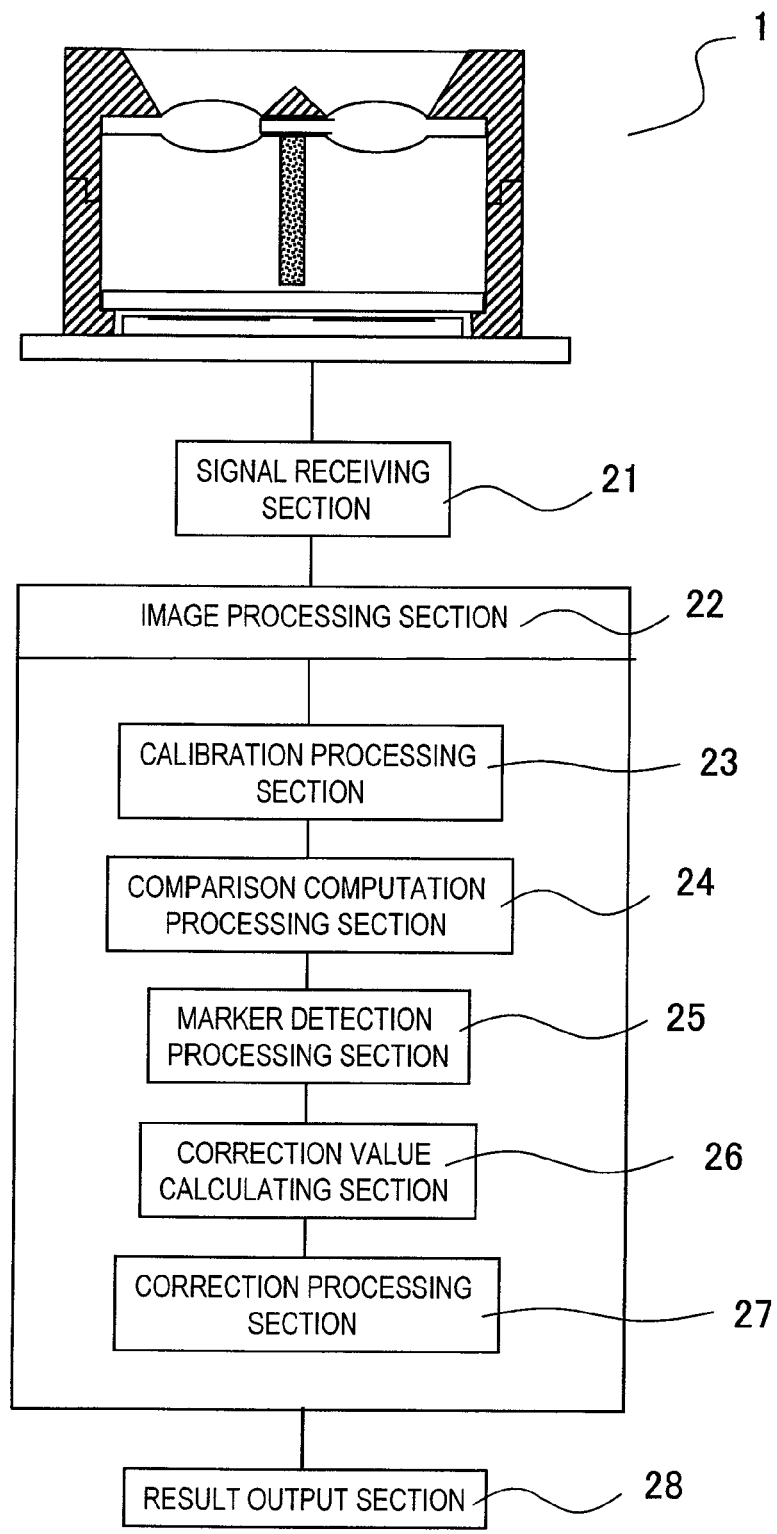
FIG. 3 is a block diagram illustrating the signal receiving section 21 and the internal configuration of the image processing section 22.

FIG. 3 is a block diagram illustrating the signal receiving section 21 and the internal configuration of the image processing section 22. As shown in FIG. 3, the electrical signal supplied from the imager 4 enters the signal receiving section 21 first, where the signal is transformed so as to get ready for computational processing. In this signal receiving section 21, a correlation double sampling circuit (CDS), for example, may reduce the noise of the electrical signal to generate image signals. Optionally, the signal receiving section 21 may also perform the function of sorting the image signals on a memory in the image processing section 22, for instance.

The image signals generated by the signal receiving section 21 are then input to the image processing section 22, in which, first of all, a calibration processing section 23 subjects the image signals to a type of correction to get them ready for computational processing. If two images have been detected from a single image capturing area, for example, then the calibration processing section 23 cuts out those images, stores them in different memories, does origin setting and other kinds of processing, and then shapes the images by distortion correction, for instance. When the distortion correction is carried out, the distortion of the images 50a and 50b is corrected based on the distortion values obtained from the actual images and designed values.

Next, a comparison computation processing section 24 divides each of these images 50a and 50b into a plurality of blocks and calculates the magnitudes of parallax actually detected $\Delta x$ and $\Delta y$ in each of those blocks.

Subsequently, a marker detection processing section 25 determines the locations of the markers on the images 50a and 50b.

Thereafter, a correction value calculating section 26 calculates the positions of the optical axes of the first and second lenses 3a and 3b on the first and second image capturing elements 4a and 4b by reference to the information about the markers' locations.

Next, a correction processing section 27 calculates and substitutes the base line length B and the magnitude of the parallax $\Delta$ into an equation representing the principle of triangulation, thereby determining the distance to the object.

Thereafter, the distance to the object is output by a result output section 28.

Optionally, the result output section 28 may have the function of complementing information about the location of the marker's shadow on one of the two images 50a and 50b with information about that of the marker's shadow on the other image. For example, if no marker's shadow has been cast on the image 50a, then the result output section 28 may have the function of complementing information about the location of the marker's shadow on the image 50a with information about that of the marker's shadow on the other image 50b to produce an output image. A specific complementing method will be described later.

Alternatively, the comparison computation processing section 24 may be arranged after the marker detection processing section 25 and the correction value calculating section 26 (i.e., between the correction value calculating section 26 and the correction processing section 27). The operations of the comparison computation processing section 24, the correction value calculating section 26 and the correction processing section 27 will be described in detail later.

Figure 4:
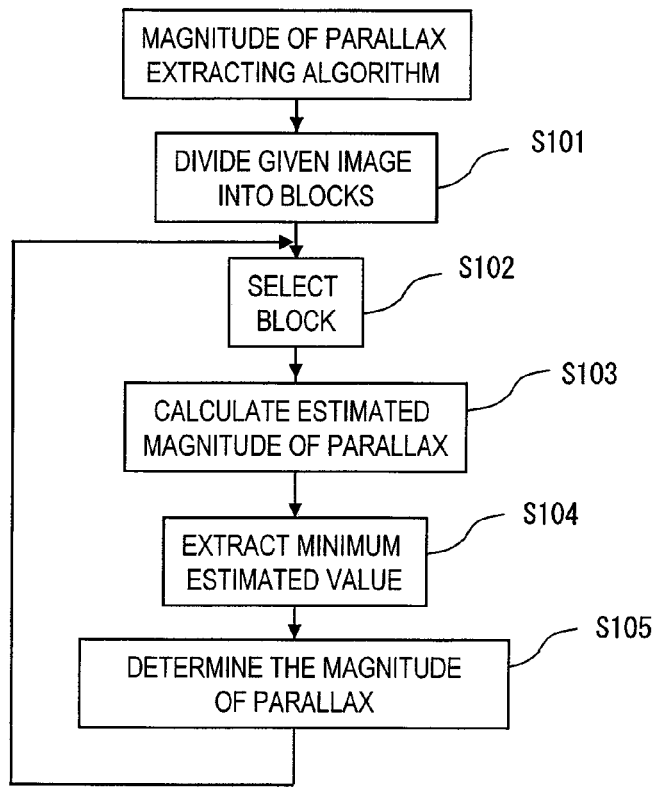
FIG. 4 is a flowchart showing the basic flow of the magnitude of parallax extracting algorithm.
Figure 5:
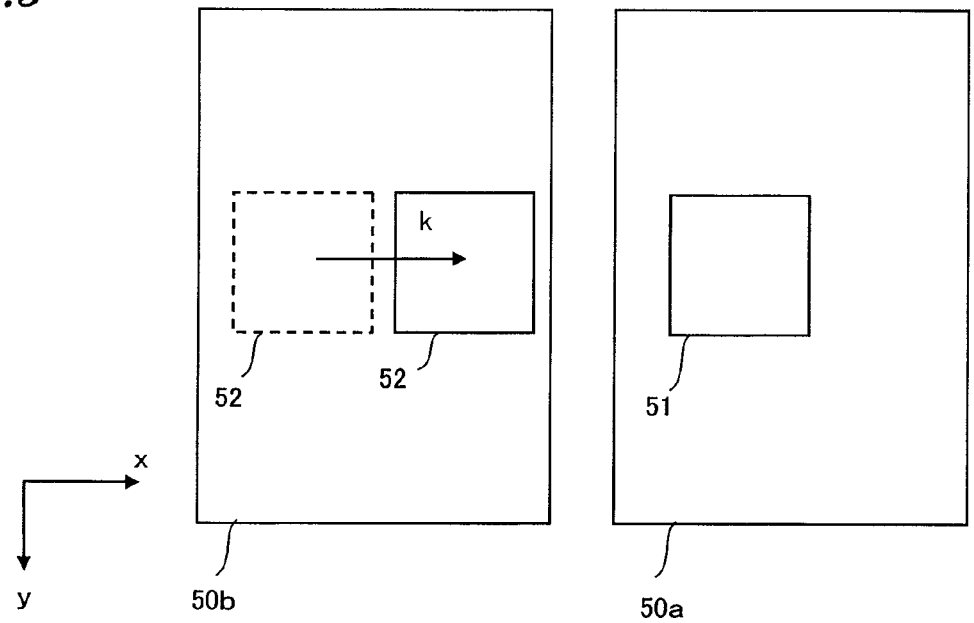
FIG. 5 illustrates detection blocks of the images 50a and 50b that have been detected from the first and second image capturing areas 4a and 4b.

Next, it will be described with reference to FIGS. 4 and 5 through what steps the comparison computation processing section 24 shown in FIG. 3 calculates the magnitudes of the parallax detected Δx and Δy. In the following example, the magnitudes of the parallax detected Δx and Δy are calculated by performing comparison computation processing on the two images 50a and 50b. FIG. 4 is a flowchart showing the basic flow of the magnitude of parallax extracting algorithm. And FIG. 5 illustrates detection blocks of the images 50a and 50b that have been detected from the first and second image capturing areas 4a and 4b.

First, in Step S101, the image 50a that has been detected from the first image capturing area 4a is divided into a number of blocks, each of which may have a size of roughly 4×4 pixels through 64×64 pixels that may be determined arbitrarily according to the dimension of the object. It should be noted that if the lens has had its zoom power increased, the detection block preferably has its size increased, too.

Next, in Step S102, a first detection block 51 is selected from those blocks of the image 50a. The object's location on the image 50b has shifted from the one on the image 50a due to parallax or a variation in temperature. That is why to detect how much that shift is, a second detection block 52 of the same size as the first detection block 51 is put on the image 50b and then moved, thereby getting pattern matching done. Specifically, first, the second detection block 52 is put on the image 50b at the same relative location as the first detection block 51 on the image 50a. If the lenses are arranged side by side in the x direction, then the parallax will be generated only in the x direction. Thus, the second detection block 52 is moved by k pixels (where k is an arbitrary integer) in the x direction.

Subsequently, in Step S103, an estimated magnitude of parallax is calculated. Specifically, first, the pixel outputs of the second detection block 52 are subtracted from those of the first detection block 51. And the absolute values of those differences, which have been calculated on every pixel within the first and second detection blocks 51 and 52, are added together and the sum thus obtained is regarded as the estimated magnitude of parallax.

Supposing the output value of a pixel at the location (a, b) in the first detection block 51 is identified by GG1(a, b) and the output value of a pixel at the location 53 (a+k, b) in the second detection block 52 is identified by GG2(a+k, b), the estimated magnitude of parallax R(k) is calculated by the following Equation (2):

$$R(k) = \sum_a \sum_b |GG1(a, b) - GG2(a+k, b)| \quad (2)$$

This estimated magnitude of parallax R(k) represents how much correlation an image portion of the second detection block 52 that has been moved by k pixels and its counterpart in the first detection block 51 have. Multiple values of 1 through n are substituted for k, and the processing steps S102 and S103 are carried out on each of those values, thereby calculating the estimated magnitude of parallax R(k), which varies according to the k value.

Figure 6:
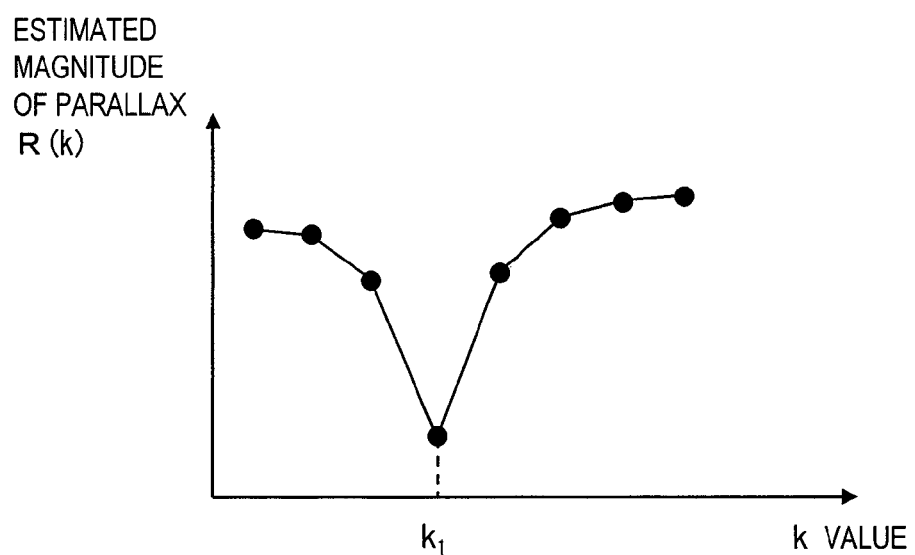
FIG. 6 is a graph showing how the estimated magnitude of parallax R(k) changes with the number k of pixels by which the second detection block 52 has been moved.

FIG. 6 is a graph showing how the estimated magnitude of parallax R(k) changes with the number k of pixels by which the second detection block 52 has been moved. In FIG. 6, the abscissa represents the number k of pixels by which the block 52 has been moved in the x direction, while the ordinate represents the estimated magnitude of parallax R(k).

Next, in Step S104, the minimum value of the estimated magnitudes of parallax R(k) that have been calculated in the previous processing step S103 is extracted. If the estimated magnitude of parallax R(k) is the minimum, then it means that the difference in pixel output between the two detection blocks 51 and 52 is the smallest. That is why the smaller the estimated magnitude of parallax R(k), the more similar the image portions represented by the two detection blocks 51 and 52 would be. In the example illustrated in FIG. 6, the estimated magnitude of parallax R(k) has the minimum value when k=k1. Thus, it can be seen that the image portions represented by the two detection blocks 51 and 52 are most similar to each other when k=k1.

Then, in Step S105, that number k1 of pixels moved when the estimated magnitude of parallax R(k) has the minimum value is detected. And it is determined that if the second detection block 52 on the image 50b is moved in the x direction by k1 pixels, the image portion represented by the second detection block 52 matches its counterpart represented by the first detection block 51. Consequently, the number k1 of pixels moved is defined as the magnitude of parallax (Δx=k1) between the first and second detection blocks 51 and 52.

By performing this series of processing steps S102 through S105 on each and every one of the divided blocks obtained in the processing step S101, the distribution of the magnitudes of parallax detected Δx, Δy over the entire image 50a is calculated.

Figure 7:
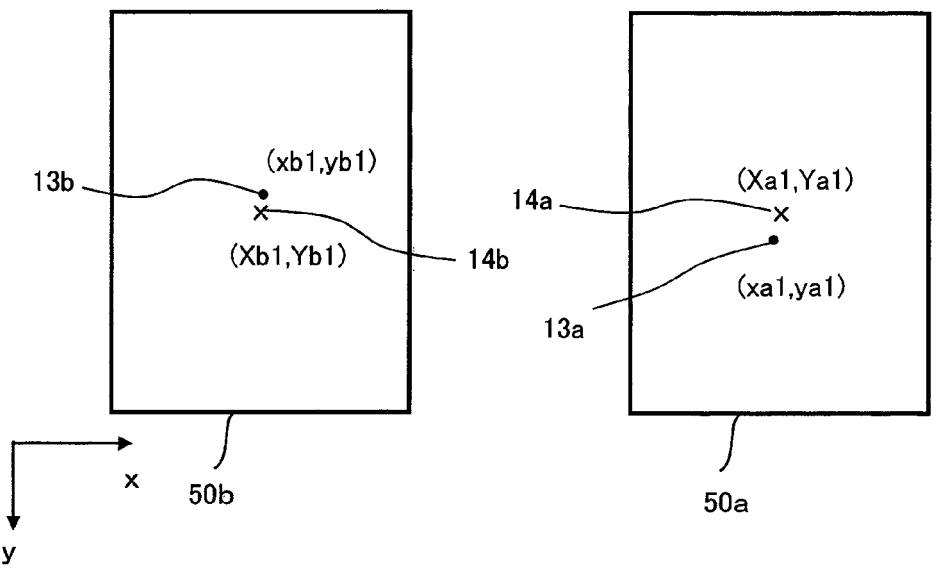
FIGS. 7(a) and 7(b) illustrate the images 50a and 50b detected from the first and second image capturing areas 4a and 4b at room temperature T1 (° C.), which is an initial value, and at room temperature T2 (° C.), which is a temperature varied from the initial one, respectively.
Figure 7:
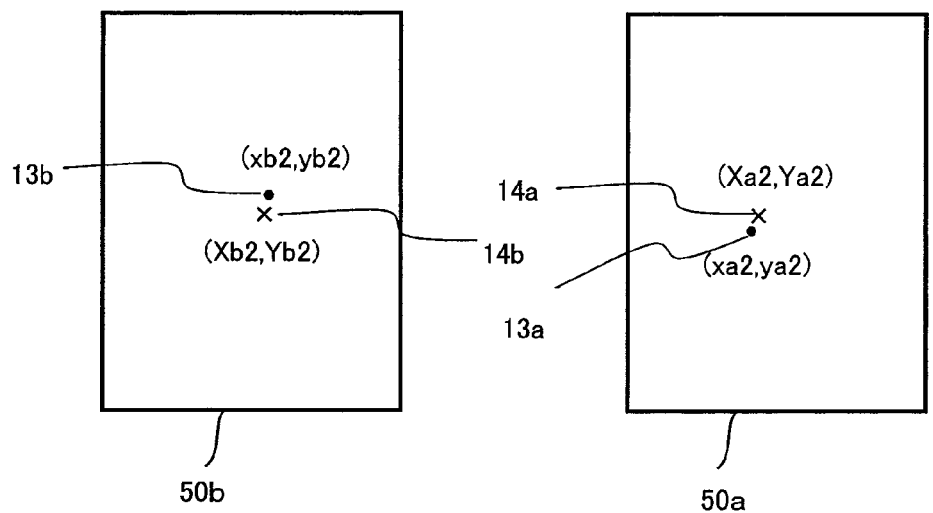

Next, it will be described with reference to FIG. 7 exactly how the marker detection processing section 25, the correction value calculating section 26 and the correction processing section 27 shown in FIG. 3 calculate the distance to the object. FIG. 7(a) illustrates the images 50a and 50b detected from the first and second image capturing areas 4a and 4b, respectively, at room temperature T1 (° C.), which is an initial value. On the other hand, FIG. 7(b) illustrates the images 50a and 50b detected from the first and second image capturing areas, respectively, at room temperature T2 (° C.), which is the temperature when the distance is measured.

As shown in FIG. 7(a), at the temperature T1 (° C.), the shadow 13a of the marker on the image 50a has coordinates (xa1, ya1) and the position 14a of the optical axis on the image 50a in the first image capturing area 4a has coordinates (Xa1, Ya1). Meanwhile, at the temperature T1 (° C.), the shadow 13b of the marker on the image 50b has coordinates (xb1, yb1) and the position 14b of the optical axis on the image 50b in the second image capturing area 4b has coordinates (Xb1, Yb1).

On the other hand, at the temperature T2 (° C.), the shadow 13a of the marker on the image 50a has coordinates (xa2, ya2) and the position 14a of the optical axis on the image 50a in the first image capturing area 4a has coordinates (Xa2, Ya2) as shown in FIG. 7(b). Meanwhile, at the temperature T2 (° C.), the shadow 13b of the marker on the image 50b has coordinates (xb2, yb2) and the position 14b of the optical axis on the image 50b in the second image capturing area 4b has coordinates (Xb2, Yb2) as shown in FIG. 7(b).

In this preferred embodiment, the first and second markers 11a and 11b cast their shadows substantially on the respective centers of the first and second image capturing areas 4a and 4b. As used herein, "substantially on the center" refers to not only a situation where the shadow is cast right on the center of the image capturing area but also a situation where the shadow is cast slightly off the center due to an error. That is why the location of the shadow 13a and the position 14a of the optical axis are close to each other, so are the location of the shadow 13b and the position 14b of the optical axis. Thus, when the temperature varies, the shadow 13a and the optical axis position 14a would shift to approximately the same degree, and the shadow 13b and the optical axis position 14b would also shift to approximately the same degree. In that case, the following Equations (3) are satisfied:

$$\begin{cases} Xa2 = Xa1 + (xa2 - xa1) \\ Ya2 = Ya1 + (ya2 - ya1) \\ Xb2 = Xb1 + (xb2 - xb1) \\ Yb2 = Yb1 + (yb2 - yb1) \end{cases} \quad (3)$$

Among the coordinates used in these Equations (3), the coordinates (Xa1, Ya1) and (Xb1, Yb1) of the optical axis positions 14a and 14b at the temperature T1 (° C.) can be detected as initial values during the initialization (i.e., the calibration processing) while the apparatus is being assembled. Likewise, the coordinates (xa1, ya1) and (xb1, yb1) of the shadows 13a and 13b at the temperature T1 (° C.) can be detected from the images 50a and 50b shown in FIG. 7(a). On the other hand, the coordinates (xa2, ya2) and (xb2, yb2) of the shadows 13a and 13b at the temperature T2 (° C.) can be detected from the images 50a and 50b shown in FIG. 7(b). By substituting these values into Equations (3), the coordinates (Xa2, Ya2) and (Xb2, Yb2) of the optical axis positions 14a and 14b at the temperature T2 (° C.) can be obtained.

Using the values of the coordinates (Xa2, Ya2) and (Xb2, Yb2) obtained by Equation (3), the base line length B, which is the gap between the respective optical axes of the first and second lenses 3a and 3b, is calculated by the following Equation (4). On the other hand, the magnitude of the parallax Δ is calculated by the following Equation (5) with the shift of the optical axis, caused due to a temperature variation, taken into account:

$$B = \sqrt{(Xa2 - Xb2)^2 + (Ya2 - Yb2)^2} \quad (4)$$

$$\Delta = \sqrt{\{(Xb2 - Xb1) - (Xa2 - Xa1) + \Delta x\}^2 + \{(Yb2 - Yb1) - (Ya2 - Ya1) + \Delta y\}^2} \quad (5)$$

In Equation (5), Δx and Δy represent the distributions of the magnitudes of parallax detected over the entire images 50a and 50b that have been calculated in the processing step S105 shown in FIG. 4. By using these equations on the respective blocks, the magnitudes of parallax are corrected.

Hereinafter, it will be described specifically how to complement a marker's location in a situation where the shadow 13a or 13b of the marker is not cast on one of the images 50a and 50b. In the example to be described below, the shadow 13a of the marker is supposed to be not cast on the image 50a at the temperature T2 (° C.).

As the temperature varies, the transparent plate 6 shown in FIG. 1(b) will expand or shrink radially from/toward its center. On the transparent plate 6, the second marker 11b is put anywhere within the region 10b. The region 10 as a whole is located on the negative side of the x direction with respect to the center of the transparent plate 6. For that reason, no matter where the second marker 11b is placed within the region 10, the second marker 11b will shift on the same side of the x direction when the temperature varies from T1 (° C.) to T2 (° C.). Meanwhile, the region 10 covers both the positive and negative sides of the y direction with respect to the center of the transparent plate 6. That is why the second marker 11b will shift in one of two different directions depending on whether the second marker 11b is located on the positive side or the negative side of the region 10. That is to say, as for the image 50b, as the temperature varies from T1 (° C.) to T2 (° C.), the location of the marker's shadow 13b will shift by −(xb2−xb1) in the x direction and will also shift by either +(yb2−yb1) or −(yb2−yb1) in the y direction.

When the temperature varies from T1 (° C.) to T2 (° C.), the markers' shadows 13a and 13b will shift to approximately the same degree on the images 50a and 50b, respectively. That is why the magnitude of shift of the marker's shadow 13a on the image 50a is complemented based on that of the marker's shadow 13b on the image 50b. That is to say, the location of the marker's shadow 13a at the temperature T2 (° C.) is calculated as the sum of the location of the marker's shadow 13a at the temperature T1 (° C.) and the magnitude of shift of the location of the marker's shadow 13b on the image 50b, i.e., (xa1−(xb2−xb1), ya1±(yb2−yb1)). In this case, as for the ± sign remaining in the equation representing the y coordinate, it is determined whether + or − should be taken by determining the distance with the rangefinder left at a different temperature from the initial one (i.e., T1 (° C.)) before the apparatus is shipped. And the information thus obtained is written on the storage of the image processing section. Based on the result thus obtained, even if no marker's shadow is cast on one of the images 50a and 50b, correction can also be made so as to reduce the influence of the temperature variation.

Figure 10:
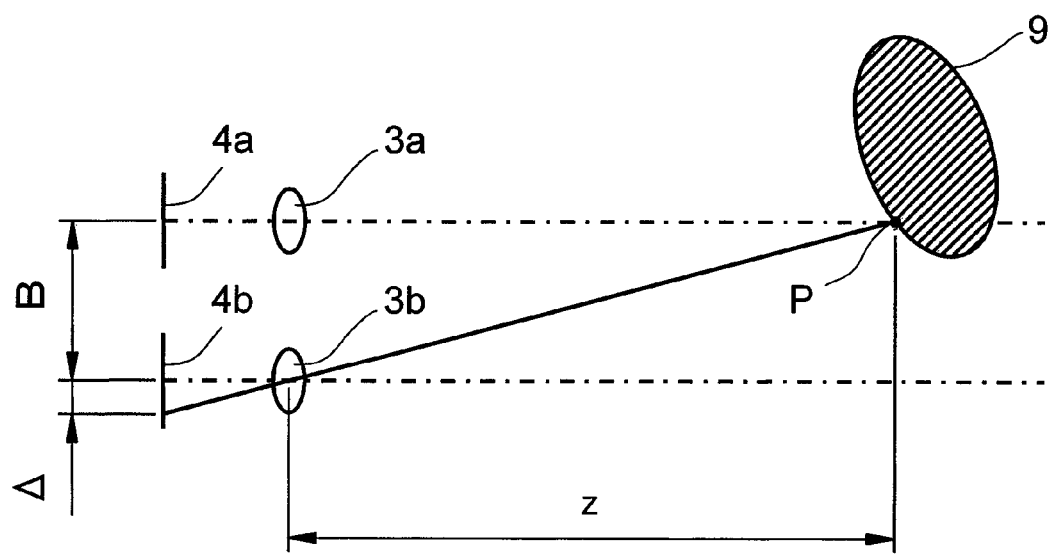
FIG. 10 illustrates how a binocular rangefinder carries out triangulation.

Next, the distance to the object is determined based on the principle of triangulation using the base line length B and the magnitude of parallax Δ thus obtained. FIG. 10 illustrates how a binocular rangefinder carries out triangulation. As shown in FIG. 10, the light reflected from the object 9 is incident on the first and second lenses 3a and 3b, thereby producing the object's images on the first and second image capturing areas 4a and 4b, respectively.

Suppose a measuring point is set at a point P on the object 9 and is located on the optical axis of the first lens 3a. In that case, the image of the point P will be produced at the intersection between the optical axis of the first lens 3a and the first image capturing area 4a. On the second image capturing plane 4b, on the other hand, the image of the point P will be produced at a point that deviates from the optical axis of the second lens 3b in the base line direction by the magnitude of parallax Δ. In this case, if the distance from the first and second lenses 3a and 3b to the point P (as measured parallel to their optical axes) is z and if the focal length of the first and second lenses 3a and 3b is f, then the following approximation Equation (6) is satisfied:

$$z \approx B \cdot f / \Delta \quad (6)$$

Since the focal length f is already known, the distance z to the point P can be calculated by substituting the base line length B and the magnitude of parallax Δ. And by calculating the distance on every image, the distance to the object 9 can be determined.

Figure 8:
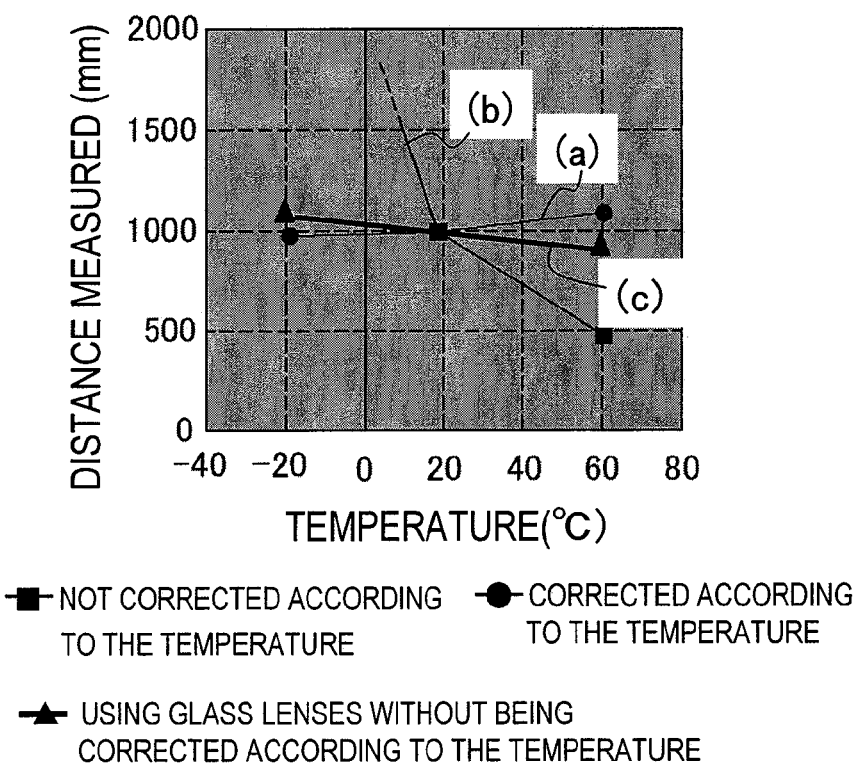
FIG. 8 is a graph showing the results that were obtained by the rangefinder in a situation where the environmental temperature was varied with the distance from the rangefinder to the object maintained at 1 m.

FIG. 8 is a graph showing the results that were obtained by the rangefinder in a situation where the environmental temperature was varied with the distance from the rangefinder to the object maintained at 1 m. In FIG. 8, the profile (a) plotted with the solid circles ● represents the results obtained by the range finding method of this preferred embodiment using resin lenses, while the profile (b) plotted with the solid squares ■ represents the results obtained by a conventional method using resin lenses. According to the profile (b), the distance measured changed significantly with a variation in temperature. On the other hand, according to the profile (a), even when the temperature varied, the distance measured remained almost the same. Furthermore, the profile (c) plotted with the solid triangles ▲ represents the results obtained by a conventional method using glass lenses. It had already been pointed out that with resin lenses, the measured values varied much more significantly due to a variation in the volume of the lenses according to the temperature, compared to a situation where glass lenses were used. However, it can be seen that even though resin lenses were used according to this preferred embodiment, the stability achieved was almost as high as the situation where glass lenses were used.

According to this preferred embodiment, even if the temperature of the environment surrounding the rangefinder has varied, the shifts of the optical axis positions of the two lenses 3a and 3b can also be tracked and the magnitude of parallax can be corrected by reference to information about the locations of the markers 11a and 11b. As a result, the error caused due to a variation in environmental temperature can be reduced so much that the distance to the object can be determined highly accurately.

The rangefinder of the preferred embodiment described above has a dual-lens structure with two lenses. However, the present invention is also applicable to a structure with three, four or more lenses, and the same effect will be achieved in any of those cases.

In the preferred embodiment described above, the markers 11a and 11b are placed on that side of the transparent plate 6 so as to face the image capturing plane because, in that case, the shadows of the markers can be detected more easily in the image capturing areas 4a and 4b. However, as long as the shapes of the markers 11a and 11b can be detected accurately in the image capturing areas 4a and 4b, the markers 11a and 11b can also be placed on the other side of the transparent plate 6 so as to face the lens system 3.

Also, in the preferred embodiment described above, the markers 11a and 11b are placed on the transparent plate 6. However, the transparent plate 6 may be replaced with a light-transmitting flat plate. Even a rangefinder with such a light-transmitting flat plate will also achieve similar effects. In that case, a normal ND filter will work reasonably fine as the light-transmitting flat plate. Although a normal ND filter has a transmittance of 10% or more, a filter with a transmittance of less than 10% could also be used. This is because the distance can also be determined as long as the light that has been transmitted through the filter can be detected by the imager. Optionally, the transparent plate may have wavelength selectivity.

Furthermore, in the preferred embodiment described above, not just the distance measured but also images can be output to an external device. However, if the image 50a is output as it is to an external device, for example, the image 50s still has the shadow 13a of the marker and its portion hidden behind the shadow 13a will lack image data. To avoid such a situation, an image portion, corresponding to that portion of the image 50a hidden behind the shadow 13a, may be cut out of the image 50b and then attached onto the marker's shadow 13a on the image 50a. Then, an image with no missing image data can be output to the external device. As for a method for searching the image for that image portion hidden behind the shadow 13a, an image portion corresponding to the marker's shadow 13a may be extracted from the image 50b by adding together the magnitude of parallax of the pixels that precede and succeeds the marker's shadow 13a obtained by the comparison computation processing section 24 shown in FIG. 3 and the coordinates of the marker obtained by the marker detection processing section 25 shown in FIG. 3.

EMBODIMENT 2

Hereinafter, a second preferred embodiment of the present invention will be described. In this second preferred embodiment, two markers are provided for each image capturing area and they will cast their shadows on the periphery of their associated image capturing area, not on the center thereof. This preferred embodiment has the same configuration as the first preferred embodiment described above except for the number and arrangement of the markers that are placed on the transparent plate.

Figure 9:
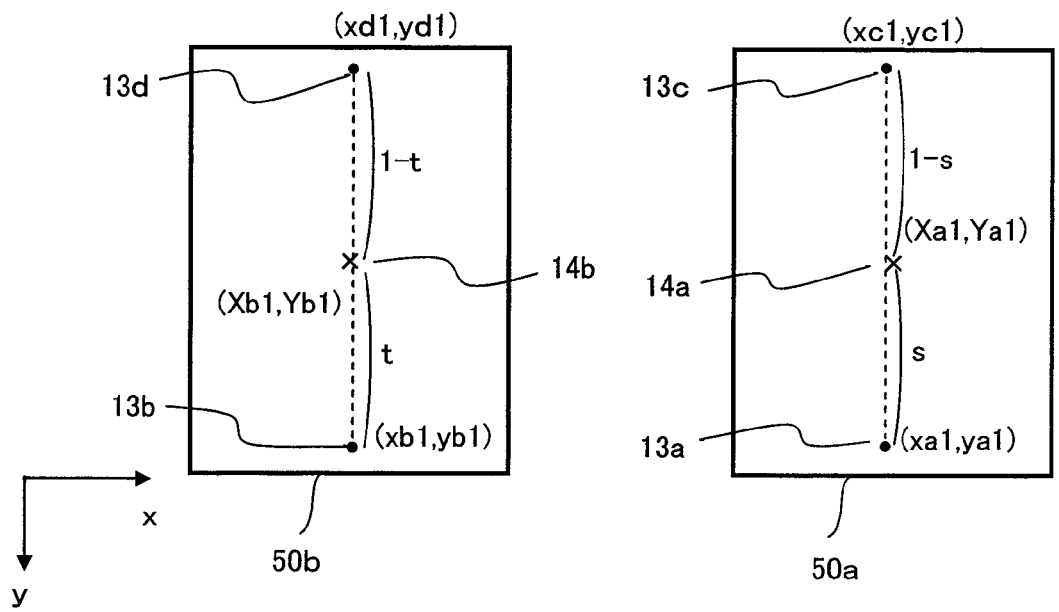
FIGS. 9(a) and 9(b) illustrate the images 50a and 50b detected from the first and second image capturing areas 4a and 4b at room temperature T1 (° C.), which is an initial value, and at room temperature T2 (° C.), which is a temperature varied from the initial one, respectively.
Figure 9:
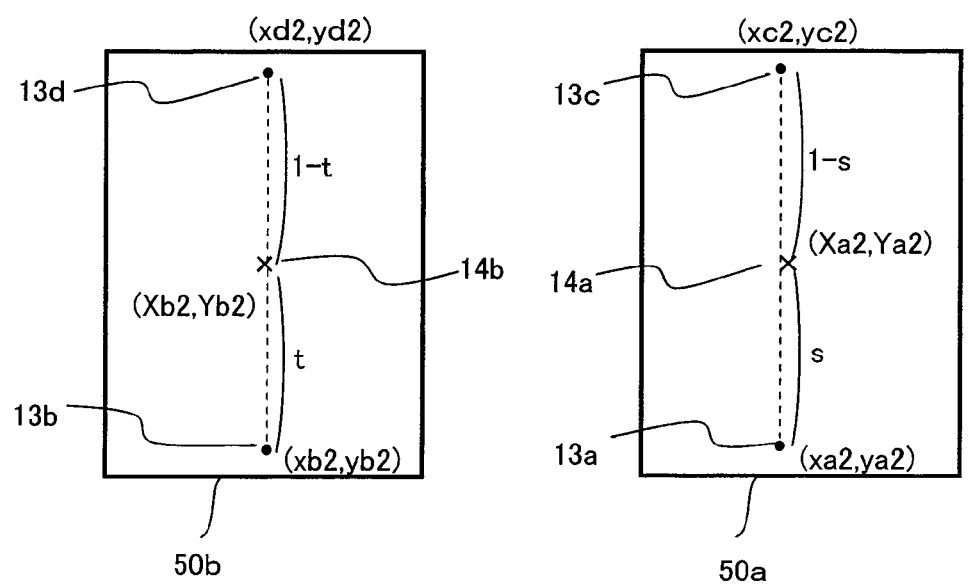

FIG. 9(a) illustrates the images 50a and 50b detected from the first and second image capturing areas 4a and 4b, respectively, at room temperature T1 (° C.), which is an initial value. On the other hand, FIG. 9(b) illustrates the images 50a and 50b detected from the first and second image capturing areas, respectively, at room temperature T2 (° C.), which is the temperature when the distance is measured.

As shown in FIG. 9(a), at the temperature T1 (° C.), the shadows 13a and 13c of the markers on the image 50a have coordinates (xa1, ya1) and (xc1, yc2) and the position 14a of the optical axis on the image 50a in the first image capturing area 4a has coordinates (Xa1, Ya1). Meanwhile, at the temperature T1 (° C.), the shadows 13b and 13d of the markers on the image 50b have coordinates (xb1, yb1) and (xd1, yd1) and the position 14b of the optical axis on the image 50b in the second image capturing area 4b has coordinates (Xb1, Yb1).

On the other hand, at the temperature T2 (° C.), the shadows 13a and 13c of the markers on the image 50a have coordinates (xa2, ya2) and (xc2, yc2) and the position 14a of the optical axis on the image 50a in the first image capturing area 4a has coordinates (Xa2, Ya2). Meanwhile, at the temperature T2 (° C.), the shadows 13b and 13d of the markers on the image 50b have coordinates (xb2, yb2) and (xd2, yd2) and the position 14b of the optical axis on the image 50b in the second image capturing area 4b has coordinates (Xb2, Yb2) as shown in FIG. 9(b).

The shadows 13a and 13c are cast on the periphery of the image 50a, not on the center thereof. Also, the optical axis position 14a in the first image capturing area 4a is located substantially at the internally dividing point of the line that connects together the shadows 13a and 13b as indicated by the dashed line. As used herein, "located substantially on the line" refers to not only a situation where the point is located right on the line but also a situation where the point is located slightly off the line due to an error. Likewise, the shadows 13b and 13d are cast on the periphery of the image 50b, not on the center thereof. Also, the optical axis position 14b in the second image capturing area 4b is located substantially at the internally dividing point of the line that connects together the shadows 13b and 13d as indicated by the dashed line.

In this preferred embodiment, the shadows 13a, 13b, 13c and 13d are cast on the respective peripheries of the first and second image capturing areas 4a and 4b, not on their center.

Those shadows may be cast anywhere as long as the optical axis positions 14a and 14b are located at the internally dividing points.

The coordinates (Xa1, Ya1) and (Xb1, Yb1) of the optical axis positions 14a and 14b at the temperature T1 (° C.) can be detected as initial values during the initialization (i.e., the calibration processing) while the apparatus is being assembled. Likewise, the coordinates (xa1, ya1), (xb1, yb1), (xc1, yc1) and (xd1, yd1) of the shadows 13a, 13b, 13c and 13d at the temperature T1 (° C.) can be detected from the images 50a and 50b shown in FIG. 9(a). On the other hand, the coordinates (xa2, ya2), (xb2, yb2), (xc2, yc2) and (xd2, yd2) of the shadows 13a, 13b, 13c and 13d at the temperature T2 (° C.) can be detected from the images 50a and 50b shown in FIG. 9(b).

On the line that connects the shadows 13a and 13c together, located as the internally dividing point is the optical axis position 14a. And the ratio of the interval between the shadow 13a and the optical axis position 14a to the interval between the optical axis position 14a and the shadow 13c (i.e., the internal division ratio) is represented as (s: 1−s) On the other hand, the ratio of the interval between the shadow 13b and the optical axis position 14b to the interval between the optical axis position 14b and the shadow 13d (i.e., the internal division ratio) is represented as (t: 1−t).

Supposing the same internal division ratio is maintained even if the temperature varies from T1 (° C.) to T2 (° C.), the following Equations (7) are satisfied:

$$\begin{cases} Xa2 = Xa1 + s(xc2 - xc1) + (1-s)(xa2 - xa1) \\ Ya2 = Ya1 + s(yc2 - yc1) + (1-s)(ya2 - ya1) \\ Xb2 = Xb1 + t(xd2 - xd1) + (1-t)(xb2 - xb1) \\ Yb2 = Yb1 + t(yd2 - yd1) + (1-t)(yb2 - yb1) \end{cases} \quad (7)$$

If the respective values described above are substituted into these Equations (7), the coordinates (Xa2, Ya2) and (Xb2, Yb2) of the intersections 14a and 14b at the temperature T2 (° C.) can be obtained.

Using the values of the coordinates (Xa2, Ya2) and (Xb2, Yb2) obtained by Equations (7), the base line length B, which is the gap between the respective optical axes of the first and second lenses 3a and 3b, is calculated by the following Equation (8). On the other hand, the magnitude of the parallax Δ is calculated by the following Equation (9) with the shift of the optical axis, caused due to a temperature variation, taken into account:

$$B = \sqrt{(Xa2 - Xb2)^2 + (Ya2 - Yb2)^2} \quad (8)$$

$$\Delta = \sqrt{\{(Xb2 - Xb1) - (Xa2 - Xa1) + \Delta x\}^2 + \{(Yb2 - Yb1) - (Ya2 - Ya1) + \Delta y\}^2} \quad (9)$$

In Equation (9), Δx and Δy represent the distributions of the magnitudes of parallax detected over the entire images 50a and 50b that have been calculated in the processing step S105 shown in FIG. 4 and already described for the first preferred embodiment.

By substituting the base line length B and the magnitude of parallax Δ obtained by Equations (8) and (9) into Equation (6), the distance z to the point P can be determined.

According to this preferred embodiment, even if the temperature of the environment surrounding the rangefinder has varied, the shifts of the optical axis positions of the two lenses 3a and 3b can also be tracked and the magnitude of parallax can be corrected by reference to information about the locations of the markers 11a, 11b, 11c and 11d. As a result, the error caused due to a variation in environmental temperature can be reduced so much that the distance to the object can be determined highly accurately.

Generally speaking, the object is often captured at the center of the image 50a or 50b. Thus, according to this preferred embodiment, even if a black object is captured at the center of an image, the markers can still be identified easily.

In the preferred embodiment described above, two pairs of markers 11a, 11b and 11c, 11d are supposed to be used (i.e., two markers are provided for each image capturing area). However, three or four pairs of markers may be used as well. By increasing the number of markers left, an unwanted situation where the markers cannot be detected due to the presence of the object's image can be avoided with more certainty.

Also, in a situation where three pairs of markers are used, if the locations of three markers in each set are defined so that the optical axis position 14a or 14b is located on the image capturing plane inside the triangle, of which the three vertices are defined by the three markers, then the optical axis position 14a, 14b can be determined unequivocally using the internal division ratio. On the other hand, if four or more pairs of markers are used, any three out of the four or more markers in each set may be chosen to define multiple triangles, the optical axis positions 14a and 14b may be set for the respective triangles, and then some statistical processing such as averaging is preferably carried out.

INDUSTRIAL APPLICABILITY

A rangefinder according to the present invention can be used effectively in cars, monitor cameras, stereoscopic shape measuring systems and so on.

The invention claimed is:

1. A rangefinder comprising:
a lens system including a number of lenses, which are arranged so that their optical axes are parallel to each other and which are integrated together;
an imager, which has a number of image capturing areas that face the respective lenses and which transforms light that has been incident on the image capturing areas into an electrical signal;
a light-transmitting flat plate, which is arranged between the imager and the lens system and which has substantially the same thermal expansion coefficient as the lenses;
a number of markers, which are provided on the light-transmitting flat plate for the respective lenses and each of which casts its shadow on an associated one of the image capturing areas;
a signal receiving section, which receives the electrical signal from the imager, thereby generating a plurality of image signals representing images that have been produced in the respective image capturing areas; and
an image processing section, which receives the image signals, corrects the positions of the optical axes of the lenses by reference to information about the locations of the markers' shadows on the respective images, and determines the distance to an object by performing a triangulation based on the corrected positions of the optical axes.

2. The rangefinder of claim 1, wherein the image processing section includes a marker detection processing section, a comparison computation processing section, and a correction processing section, and wherein the marker detection processing section determines the locations of the markers' shadows on the respective images to be detected marker locations, and wherein the comparison computation processing section calculates the magnitude of parallax detected based on a difference in the object's location between the respective images, and wherein the correction processing section corrects the positions of the optical axes based on initial marker locations and initial optical axis positions that have been detected in advance and the detected marker locations, and wherein the image processing section determines the distance to the object by performing the triangulation based on the corrected optical axis positions and the magnitude of the parallax detected.

3. The rangefinder of claim 2, wherein the initial marker locations and the initial optical axis positions are detected when the lenses and the light-transmitting flat plate have a first temperature, and wherein the detected marker locations are determined when the lenses and the light-transmitting flat plate have a second temperature.

4. The rangefinder of claim 2, wherein the markers are a first set of peripheral markers that cast their shadows on the periphery of their associated image capturing areas, and wherein a second set of peripheral markers are further provided on the light-transmitting flat plate for the respective lenses, each of the peripheral markers of the second set casting its shadow on the periphery of an associated one of the image capturing areas, and wherein each said initial optical axis position is defined so as to be substantially on the line that connects together the respective initial marker locations of their associated peripheral markers in the first and second sets.

5. The rangefinder of claim 1, wherein each said marker casts its shadow substantially on the center of its associated image capturing area.

6. The rangefinder of claim 1, wherein the lens system and the light-transmitting flat plate are fixed with the same member by the same fixing method.

7. The rangefinder of claim 1, wherein the markers are placed on one side of the light-transmitting flat plate so as to face the image capturing areas.

8. A method for determining the distance to an object using a rangefinder that includes: a lens system including a number of lenses, which are arranged so that their optical axes are parallel to each other and which are integrated together; an imager, which has a number of image capturing areas that face the respective lenses and which transforms light that has been incident on the image capturing areas into an electrical signal; a light-transmitting flat plate, which is arranged between the imager and the optical system and which has substantially the same thermal expansion coefficient as the lenses; and a number of markers, which are provided on the light-transmitting flat plate for the respective lenses and each of which casts its shadow on an associated one of the image capturing areas, the method comprising the steps of:
(a) receiving the electrical signal from the imager, thereby generating a plurality of image signals representing images that have been produced in the respective image capturing areas;
(b) determining the locations of the markers' shadows on the respective images to be detected marker locations;
(c) calculating the magnitude of parallax detected based on a difference in the object's location between the respective images; and
(d) correcting the positions of the optical axes of the lenses based on initial marker locations and initial optical axis positions that have been detected in advance and the detected marker locations and determining the distance to the object by performing a triangulation based on the corrected optical axis positions and the magnitude of the parallax detected.

9. The method of claim 8, wherein each said marker casts its shadow substantially on the center of its associated image capturing area.

10. The method of claim 8, wherein the markers are a first set of peripheral markers that cast their shadows on the periphery of their associated image capturing areas, and wherein a second set of peripheral markers are further provided on the light-transmitting flat plate for the respective lenses, each of the peripheral markers of the second set casting its shadow on the periphery of an associated one of the image capturing areas, and wherein each said initial optical axis position is defined so as to be substantially on the line that connects together the respective initial marker locations of their associated peripheral markers in the first and second sets, and wherein the step (b) includes determining the locations of the shadows of the peripheral markers in the first and second sets that are cast on the respective image capturing areas.

\* \* \* \* \*